Nov. 25, 1969  H. E. MILES, JR., ET AL  3,479,735
SHAFT END MACHINING METHOD AND MACHINE TOOL
Filed Dec. 5, 1966  6 Sheets-Sheet 1

INVENTORS
HARRY E. MILES JR.
DALE W. WRIGHT
BY
Learman, Learman & McCulloch

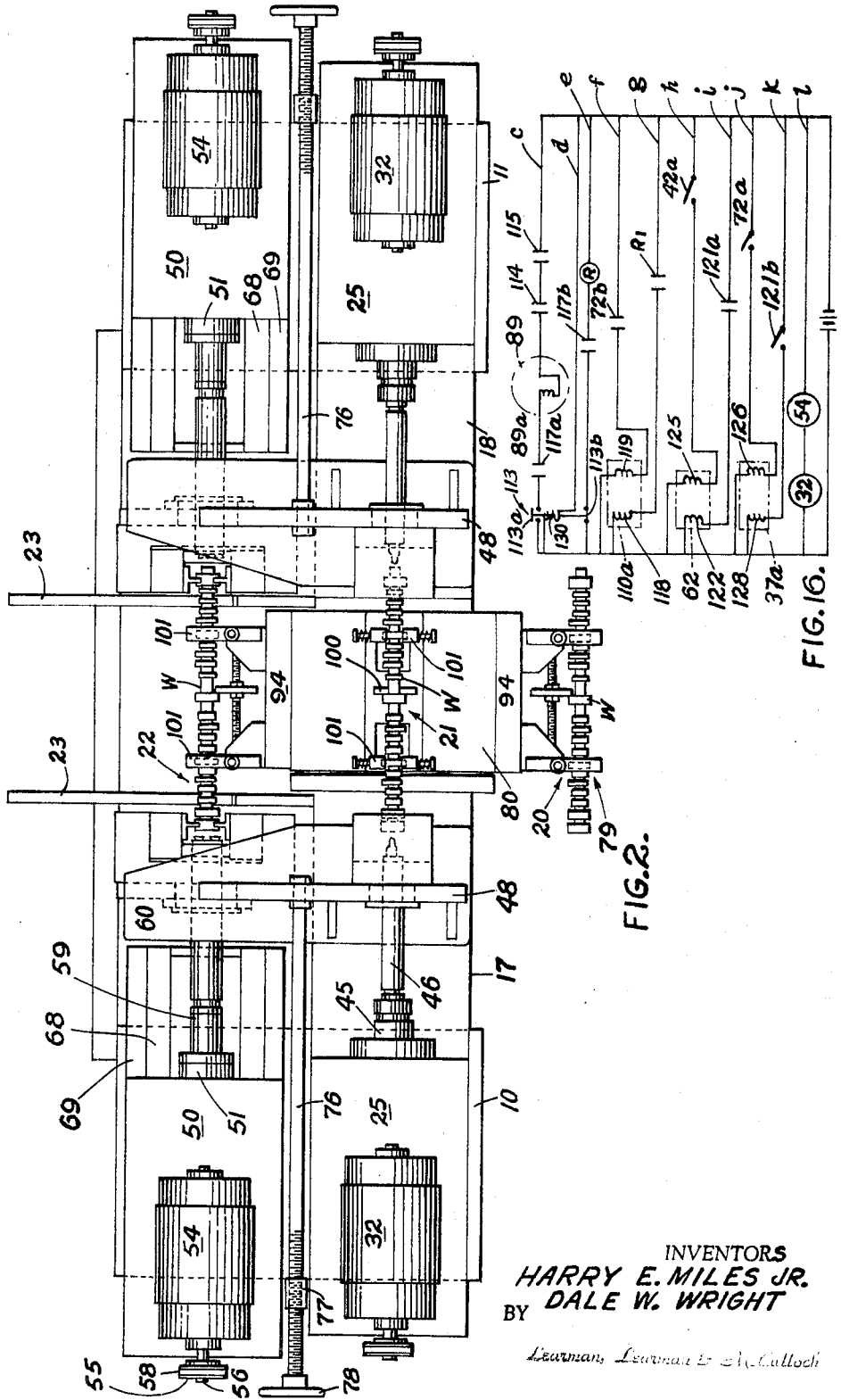

Nov. 25, 1969  H. E. MILES, JR., ET AL  3,479,735
SHAFT END MACHINING METHOD AND MACHINE TOOL
Filed Dec. 5, 1966  6 Sheets-Sheet 3

INVENTORS
HARRY E. MILES JR.
DALE W. WRIGHT
BY

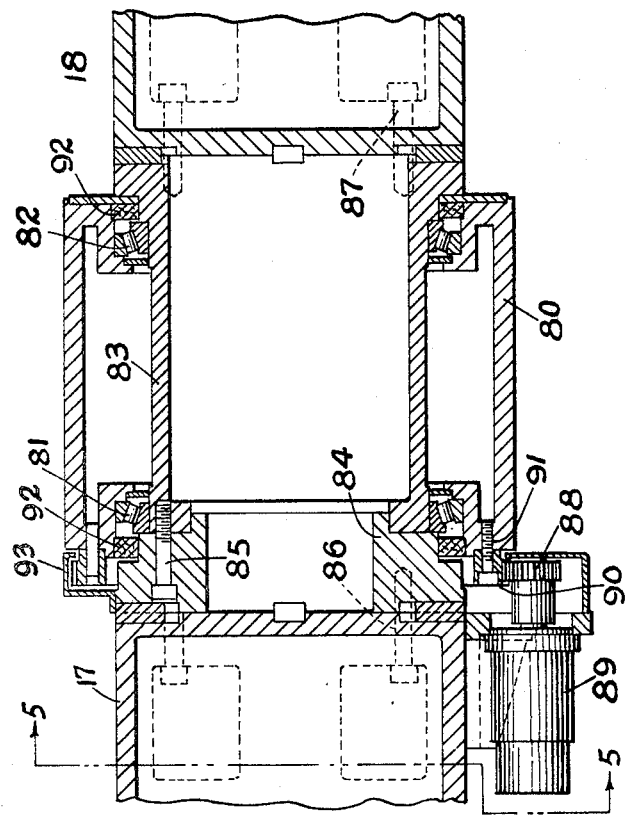
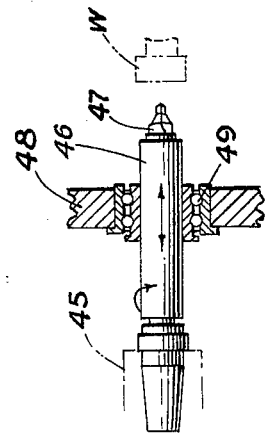
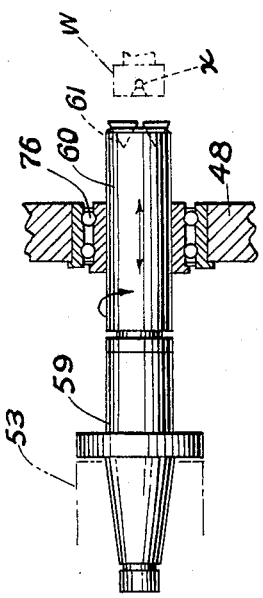
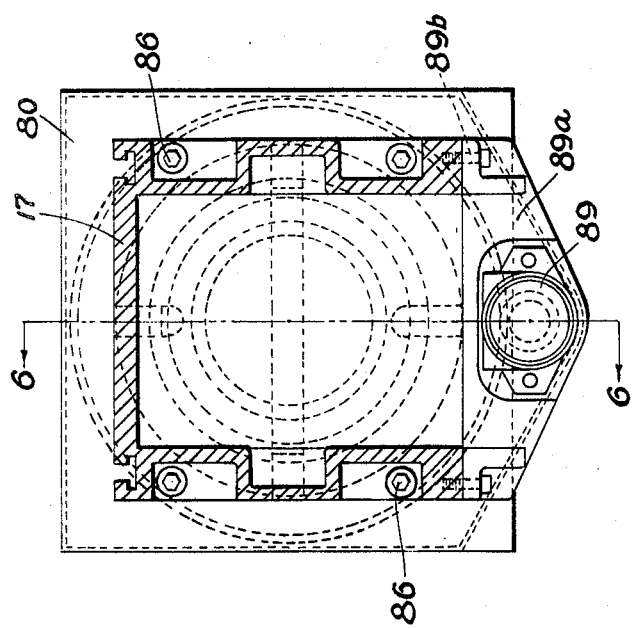

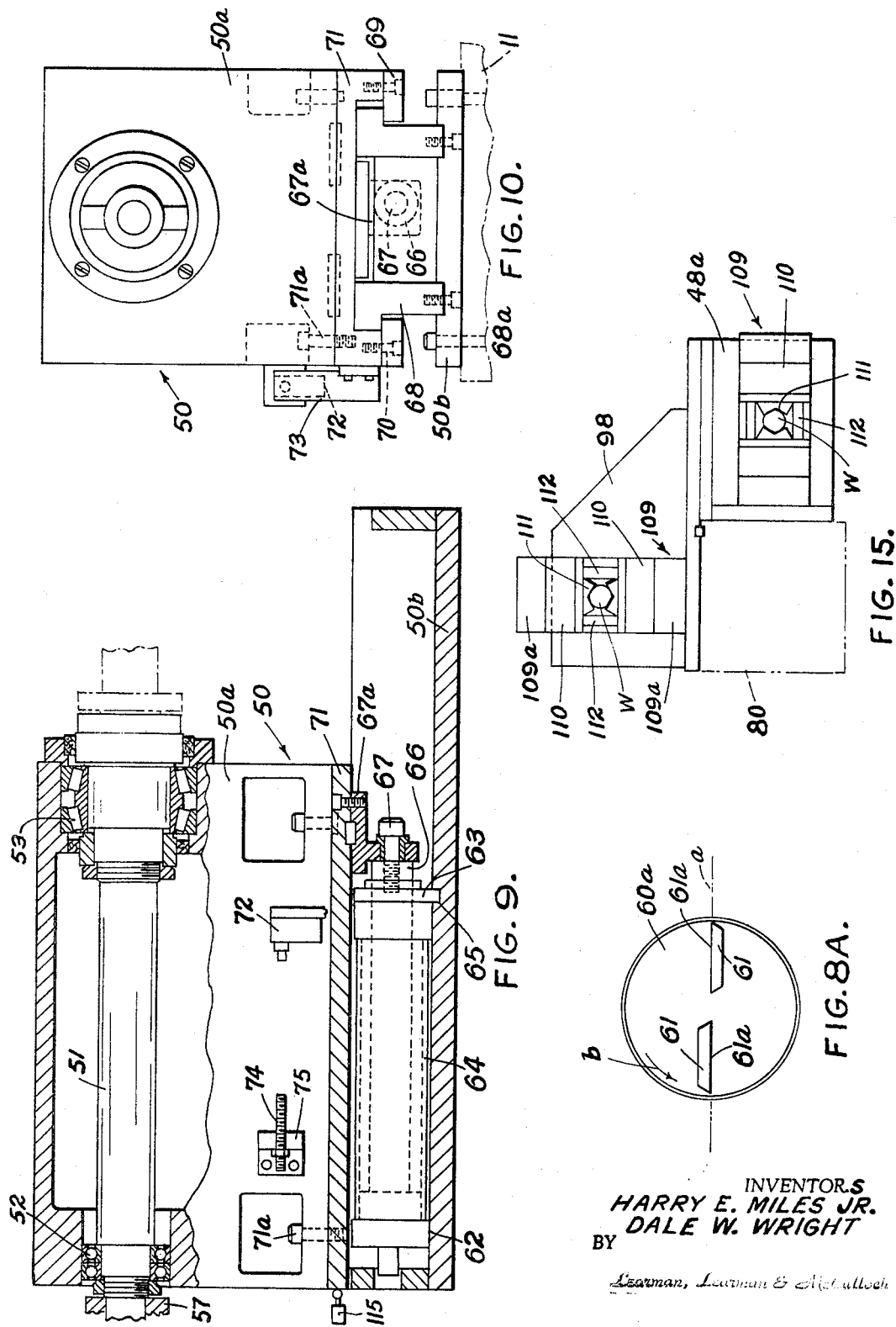

Nov. 25, 1969   H. E. MILES, JR., ET AL   3,479,735
SHAFT END MACHINING METHOD AND MACHINE TOOL
Filed Dec. 5, 1966   6 Sheets-Sheet 6
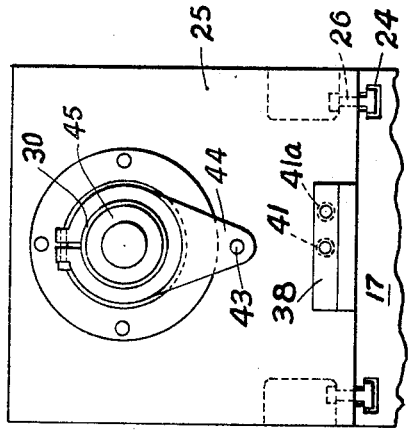
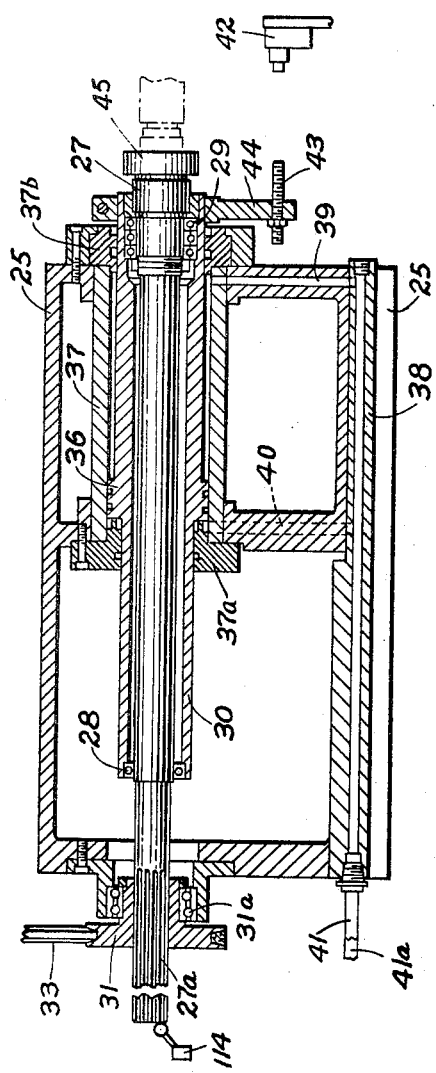
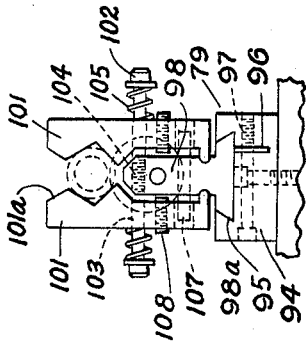
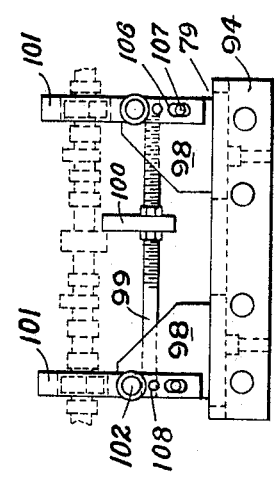
INVENTORS
HARRY E. MILES JR.
DALE W. WRIGHT
BY
Learman, Learman & McCulloch

United States Patent Office 3,479,735
Patented Nov. 25, 1969

3,479,735
SHAFT END MACHINING METHOD AND MACHINE TOOL
Harry E. Miles, Jr., and Dale W. Wright, Saginaw, Mich., assignors, by mesne assignments, to Miles Machinery Company, Saginaw, Mich., a corporation of Michigan
Filed Dec. 5, 1966, Ser. No. 599,130
Int. Cl. B23b 7/00; B23p 23/00
U.S. Cl. 29—558                                12 Claims

ABSTRACT OF THE DISCLOSURE

An apparatus and method for making shafts wherein the ends of the shafts are first center drilled and then plunge milled. Individual shafts are supported on quick release supports carried by an indexing head for sequentially indexing the shaft from the drilling station to the plunge milling station and then to a discharge station where the shafts are stripped from their supports. The drilling and plunge milling heads are simultaneously advanced toward the shafts at different speeds to permit simultaneous drilling and plunge milling of different shafts. Preferably both ends of an individual shaft are simultaneously drilled and then simultaneously plunge milled with a generally radially extending cutter member. Additional clamp members may be provided at each of the drilling and milling stations to secure the shafts.

---

This invention relates to high production machining methods and apparatus, and more particularly to methods and machines for center drilling and facing the ends of workpieces such as cam shafts of the type used in vehicle engines. It is of the utmost commercial importance to achieve an extremely high rate of production of such workpieces and to do this with cutting tool feed rates which are optimum for the particular tools being used.

Briefly, the present invention contemplates a sequential machining of the ends of a shaft in which the shaft ends are first center drilled at one station and then, after the shaft is transferred to a second station, are plunge milled, the ends of one shaft being plunge milled while the ends of another are being center drilled and shafts also being loaded and discharged at other stations while the center drilling and plunge milling operations are proceeding so that a minimum time is required to complete the desired machining of the shafts in question. Utilizing the methods and machines of the present invention, it is possible to achieve a cycle time of 10 seconds per piece, a rate of production which has, to our knowledge, never before been approached.

A principal object of the invention is to perform the machining operations described efficiently and reliably in a manner to hold the required tolerances, while at the same time effecting the considerable economies per part possible at the production rates which can be achieved.

Other objects and advantages of the invention will be pointed out specifically or will become apparent from the following description when it is considered in conjunction with the appended claims and the accompanying drawings, in which:

FIGURE 2 is a top plan view thereof;

FIGURE 5 is an enlarged, fragmentary, transverse sectional view of the rotary indexing mechanism for moving the workpieces to the respective stations, taken on the lines 5—5 of FIGURE 1 and FIGURE 6;

FIGURE 6 is an enlarged, fragmentary, longitudinal sectional view, taken on the line 6—6 of FIGURE 5;

FIGURE 7 is an enlarged, fragmentary, side elevational view more particularly illustrating the manner in which the center drilling tools are supported for rotary and axial movements;

FIGURE 8 is a similar enlarged, fragmentary, longitudinal sectional view illustrating the manner in which the plunge milling tools are supported for rotary and axial movements;

FIGURE 8A is an enlarged, front elevational view of one of the plunge milling tools;

FIGURE 9 is an enlarged, fragmentary, longitudinal sectional view illustrating the power head assemblies for revolving and feeding plunge milling tool spindles;

FIGURE 10 is a front end elevational view thereof;

FIGURE 11 is an enlarged, fragmentary, longitudinal elevational view illustrating the power head assemblies for revolving and feeding the center drilling spindles;

FIGURE 12 is a front end elevational view thereof;

FIGURE 13 is an enlarged elevational view of one of the work holder assemblies;

FIGURE 14 is an end elevational view thereof;

FIGURE 15 is a partly schematic, end elevational view of the fixture plate and associated power operated vises employed at the machining stations.

FIGURE 16 shows a typical electrical control circuit which may be employed.

General description

Figure 1:
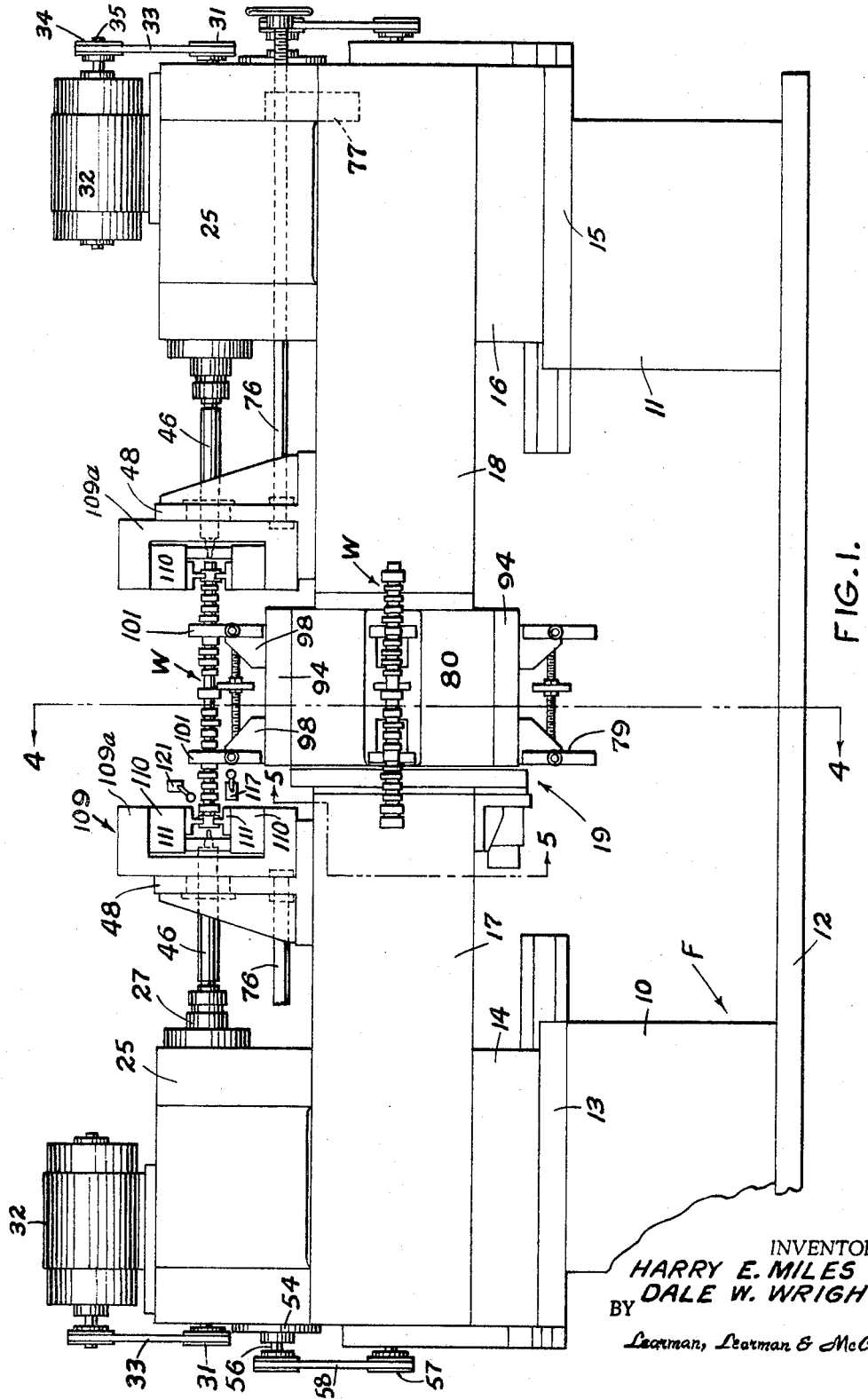
FIGURE 1 is a side elevational view of a center drilling and plunge milling machine tool with indexing work holders shown releasably clamping cam shafts which are to be sequentially machined.

Referring now more particularly to the accompanying drawings wherein we have shown a preferred embodiment of the invention only, a letter F generally indicates the frame of the machine tool of our invention which includes end blocks 10 and 11, fixed to support rails 12 which may be bolted to the floor, and mounting spacer blocks 13 and 14, and 15 and 16, respectively, on which a pair of longitudinally extending bed sections 17 and 18 are respectively fixed as shown. Mounted between the bed members 17 and 18 is a rotary workpiece indexing mechanism generally designated 19 for sequentially moving workpieces, such as the cam shaft shown and generally designated W, from a front loading station 20 (FIGURE 4) to center drilling stations 21, thence rearwardly to plunge milling stations 22, and finally to stripper bars 23 which remove the workpieces W from the workholders of the indexing mechanism 19 and discharge them in the manner indicated in FIGURE 4.

The center drilling mechanism

Figure 3:
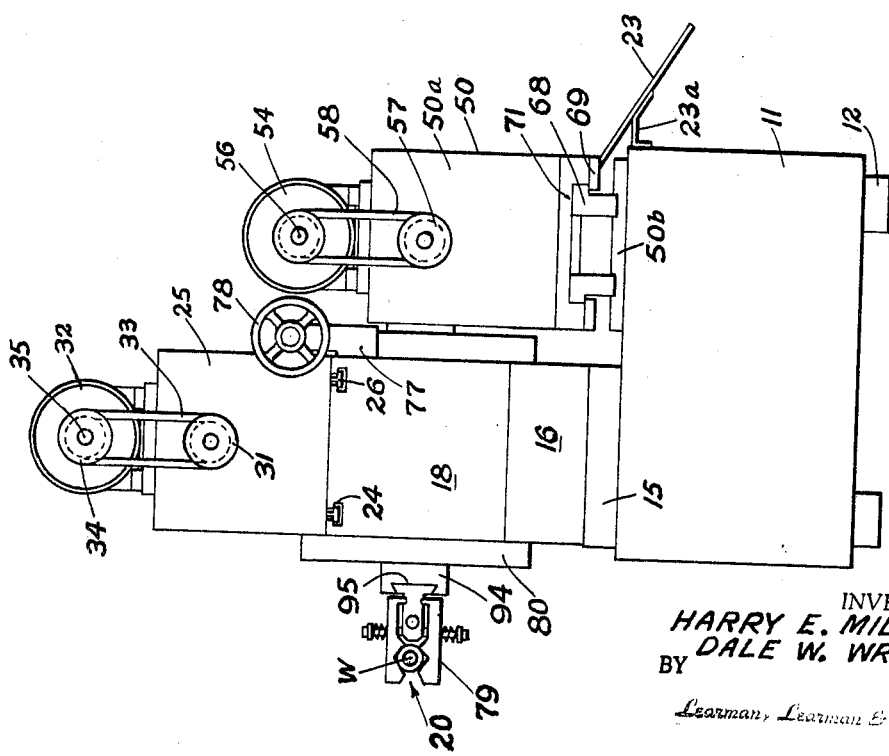
FIGURE 3 is an end elevational view thereof, taken from the right end of FIGURES 1 and 2.

Provided in the bed sections 17 and 18 are T slots 24 which permit tandem arranged, center drill spindle power head assemblies 25 to be secured rigidly in place by means such as bolts 26 (FIGURES 3 and 12). The power head assemblies 25 are of conventional design and include spindles generally designated 27 (see FIGURES 11 and 12) journalled by front and rear bearings 28 and 29, respectively, provided in quills 30. The protruding rear ends of the spindles 27 are splined as at 27a to receive correspondingly notched pulleys 31 which are journalled by bearings 31a supported on the rear ends of the power head assemblies 25. The pulleys 31 are drivingly connected with electric motors 32 fixed on the power head assemblies 25 by belts 33 trained around these pulleys and around pulleys 34 fixed on the armature shafts 35 of the motors 32.

Each quill 30 is provided with the usual piston 36 which is received in the cylinder 37 having cylinder heads 37a and 37b, which is incorporated in each power head housing 25. Provided in the lower end of each housing 25 is a hydraulic manifold member 38 which communicates with ports 39 and 40 in the housing 25 leading to opposite ends of the quill piston 36. Conduits such as are shown at 41 and 41a lead to and from a suitable hydraulic fluid system which includes valves for moving the pistons 36 forwardly and rearwardly at the desired rates of travel. Such power heads and associated hydraulic fluid systems are well known in the art and will not be described in detail. The Bihler United States Patent No. 2,915,924 and British Patent No. 806,895 are herewith incorporated by reference to illustrate typical mechanism and render it unnecessary to describe the power heads 25 in any greater detail.

In the present instance the axial movement of quills 30 is reversed when the spindles 27 have been moved forwardly a predetermined distance. A limit switch 42 (see FIGURE 11) mounted on the bed sections 17 and 18 opposite each spindle 27 is disposed in position to be actuated by a switch actuator member 43 adjustably carried by a collar 44 clamped on the front end of each quill 30. Tool holders 45 may be provided for holding the shank portions 46 of the center drills 47 which are supported near their outer ends on fixture plates 48 having ball bearings 49 supporting the front ends of the tool portions 46 for reciprocating and revolving movement (see FIGURE 7).

The plunge milling assembly

Mounted rearwardly of the power head assemblies 25 on the blocks 10 and 11 are tandem arranged, milling spindle power head assemblies generally designated 50 and including slide housings 50a mounted on base members 50b. Plunge milling spindles 51 are journalled in bearings 52 and 53 provided in the slide housings 50a. Motors 54 mounted on the power head slide housings 50a are provided to drive the spindles 51 via pulleys 55 mounted on the armature shafts 56 of the motors and pulleys 57 fixed to the spindles 51, motion transmission belts 58 being trained around the pulleys 55 and 57. Mounted on the opposite ends of spindles 51 are the tool holder assemblies 59, including the cylindrical shank members 60 which mount the twin carbide cutting tool inserts 61 (see FIGURE 8).

As FIGURES 8 and 8a indicate, the cutting tools 61 project from the end face 60a of each shank section 60 and have cutting edges 61a disposed on the axis a of shank section 60 so that rotation of the tool shank 60 in the direction b in FIGURE 8a will enable the tools 61 to perform essentially a milling operation while the tools are being advanced axially at a predetermined feed rate.

A hydraulically operated cylinder generally designated 62 is fixed to the frame portion 50b of each power head assembly 50 to move the spindles 51 axially in the cutting stroke and to retract them to original position. As FIGURE 9 indicates, a front plate 63 on each cylinder housing 64 may be received in a groove 65 provided in the frame 50b and the piston 66 which is reciprocable in each cylinder 62 may be fixed to the slide housing 50a as with a bolt 67 connecting a dependent member 67a on the slide housing 50a to the piston rod. Ways 68 may be bolted as at 68a to the fixed frame portion 50b of each power head assembly 50 as shown in FIGURE 10 to receive the guides 69 which are bolted as at 70 to support members 71 which are themselves bolted to the slide housings 50a as at 71a.

The hydraulic control circuit which supplies fluid under pressure to the pistons 36 shown in FIGURE 11 at the same time supplies fluid under pressure to the left end of each cylinder 62 to move the spindles 51 forwardly in a cutting stroke. A limit switch 72 mounted on a bracket 73 (FIGURE 10) fixed to the base portion 50b of each power head assembly 50 is positioned to be actuated by an actuator member 74 adjustably mounted by an actuator block 75 secured to the slide frame portion 50a of each power head assembly 50. When the limit switch 72 is actuated by the rod 74, hydraulic fluid is fed to the right end of cylinder 62 in FIGURE 9 and withdrawn from the left end thereof to retract the spindle 51 to original position.

It is highly essential to the success of the plunge milling operation that each support plate 48 include a ball bearing assembly 76 mounting the tool shank 60 for rotary and reciprocating travel. As indicated particularly in FIGURE 2, each support plate 48 is mounted for longitudinal adjustment along the bed sections 15 or 16 by threaded adjusting shafts 76 which have threaded engagement with stationary nut members 77 fixed on bed sections 15 and 16, hand wheels 78 being provided to facilitate adjustment of the support plate members 48.

The work holding and transfer mechanism

Figure 4:
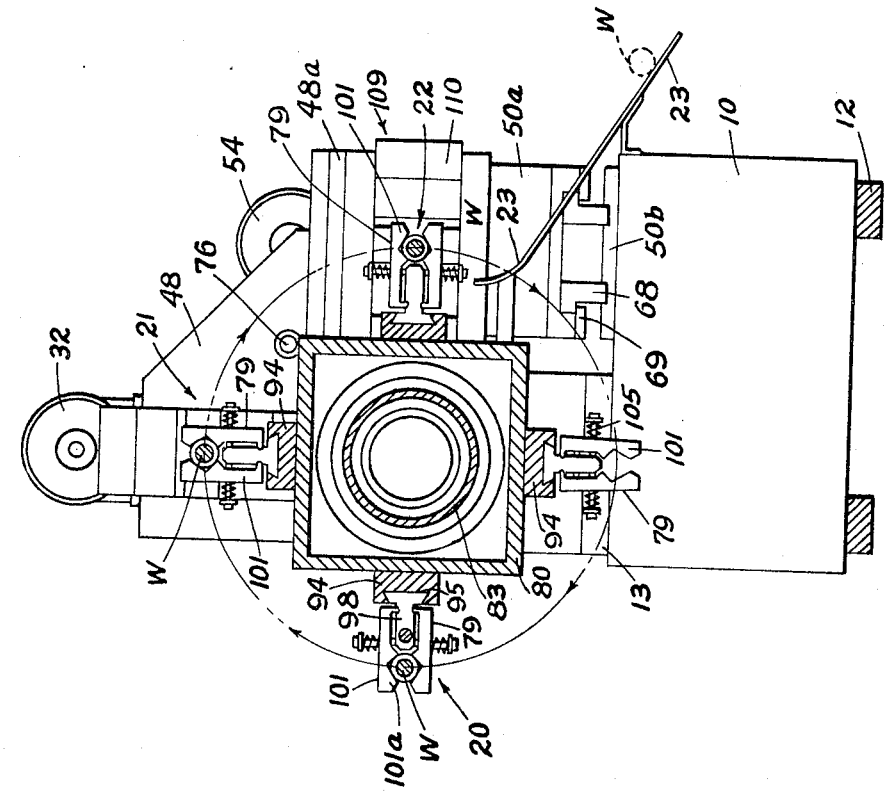
FIGURE 4 is a transverse sectional view taken on the line 4—4 of FIGURE 1 to more particularly illustrate the workpiece indexing mechanism employed.

The rapid transfer indexing mechanism generally designated 19 includes a series of work holding chucks, generally designated 79 and which will presently by described in detail, mounted as shown in FIGURE 4 on an indexing head 80 which moves them from the loading station 20 to the center drilling stations 21 and thence on to the plunge milling stations 22. As FIGURES 5 and 6 indicate, the square indexing heads 80 are rotatably mounted by roller bearings 81 and 82 on a fixed tubular trunnion 83 which is fixed to an end plate 84 at one end as with bolts 85, the end plate 84 being bolted as at 86 to the one bed section 17. At its opposite end the trunnion 83 may be secured to the bed section 18 by bolts 87. A spur gear 88, driven by a suitable motor 89 mounted on a plate 89a fixed to bed section 17 by bolts 89b, is provided for indexing the head 80 in 90° increments, the spur gear 88 being in mesh with a ring gear 90 bolted to the head 80 as at 91. To prevent the entry of foreign matter, seal members 92 and end housings 93 are carried by the indexing member 80 and end plate 84, respectively.

Blocks 94 on each face of the indexing member 80 are provided with undercut grooves 95 for receiving the workholding chucks 79 which will now be described in detail. Clamped securely in each of the blocks 94, which include walls partially split as at 96 (FIGURE 14) by clamp screws 97 are a pair of spaced apart jaw supporting members 98 connected by a threaded rod 99 on which a work contacting locator plate 100 may be adjustably mounted to engage one of the cams on the cam shaft workpiece W as shown in FIGURE 19. The members 98 are formed with sockets 98a (see FIGURE 14) which rockably mount pairs of separable work clamping jaws 101. To normally urge the jaws 101 to closed position, spring mounting bolt members 102 are provided which exteend through openings 103 in the jaws 101 and are threaded into openings 104 provided in the jaw support plates 98, springs 105 being provided between the heads of bolts 102 and the jaws 101 to exert pressures urging the jaws normally to the closed position in which they are shown in FIGURE 14. To aid in maintaining the jaws in alignment, elongated slots 106 are provided through them to receive aligning pins 107 carried by the jaw support plates 98.

The manner of construction of the work support members 79 makes it possible to manually load workpieces W to the jaws 101 at the loading station 20 and to automatically strip them from the jaws 101 when the workpiece support members 79 are moved past the stripping bars 23. To facilitate the entry of the workpieces between the pairs of jaws 101 at the loading station 20, the jaw members 101 are provided with inclined camming surfaces 101a so that the jaws 101 are readily forced apart when the operator moves a workpiece W into engagement with the surfaces 101a. Stops 108 may be provided on the jaws 101, as shown in FIGURE 14, to determine the closed position of the jaws.

Mounted on each fixture plate 48 to assist in holding the workpiece at the center drilling stations 21 is a work clamping vise generally designated 109 which may be a self-centering, hydraulically operated Heinrich vise of the type manufactured by Heinrich Tools, Inc., of Racine, Wis., U.S.A. Such vises, which are also mounted on a dependent portion 48a of each fixture plate 48 at the plunge milling stations 22 (see FIGURE 15), include a base 109a, jaw supports 110 for the work engaging jaws 111, and pairs of guide rods 112 spanning the U-shaped bases 109a. The supports 110 incorporate hydraulic cylinders which connect to the hydraulic system and which cause the supports 110 and jaws 111 to move forwardly and rearwardly to grip and release the workpieces W respectively.

In FIGURE 16 we have shown a typical schematic electrical control circuit of a simplified type which may be employed. For the sake of convenience, only one vise cylinder 110a, one plunge milling spindle operating cylinder 62, one motor 32, one motor 54, and one valve 37a for operating a center drilling spindle operating cylinder 37 have been shown. Of course, it is to be understood that eight cylinders 110a (two for each vise 109), two cylinders 62, two motors 32, two motors 54, and two valves 37a for operating the two cylinders 37 used are employed and would be operated in the manner disclosed. Circuit line c includes the cycle start button 113 in series with a coil 89a for operating motor 89, and switches 114 (FIGURE 11) and 115 (FIGURE 9) to indicate that the spindles 45 and 53, respectively, are in retracted position. The button 113 includes first and second contact bridges 113a and 113b in lines c and e, respectively. A limit switch 117 (FIGURE 1) has contacts 117a in circuit line c and contacts 117b in series with a relay R in circuit line e. Switch 117 is operated by the indexing head 80 to indicate that the workpieces have been indexed to present new workpieces W at machining stations 21 and 22. The relay R in line e has relay contacts $R_1$ in a circuit line g in series with the advance solenoid 118 of the cylinder 110a shown. In circuit line f is the retract solenoid 119 of the cylinder 110a in series with contacts 72b. The advance solenoid 122 of double-acting cylinder 62 is in a circuit line i with contacts 121a, closed when switch 121 (FIGURE 1) is actuated by the vise jaws 112 closing, and the contacts 42a of switch 42 (FIGURE 11) are in a circuit line h in series with the retract solenoid 125 of cylinder 62. The valve 37 for operating each cylinder 37 includes a retract solenoid 126 in a circuit line j in series with the contacts 72a of switch 72 (FIGURE 9), and an advance solenoid 128 in a circuit line k in series with the contacts 121b of switch 121. Motors 32 and 54 are provided in a circuit line l. The cycle start switch button 113 may be a spring-returned, manually actuated button but preferably is a spring-returned button which is automatically closed at the time the indexing cycle is to be repeated, and a solenoid 130 in circuit line d may be provided for this purpose.

The operation

In operation, the operator first loads a workpiece W into the jaws 101 of the chuck 79 at the load station 20 and then depresses the cycle start switch 113. With limit switch 117 at this time in closed position and contacts 117a made, circuit c is closed so that work indexing motor 89 is operable to index work holding head 80, assuming that the contacts 114 and 115 are closed to prove that the plunge milling spindles 51 and center drilling spindles 27 are in retracted position. At this time, with button 113 in depressed position, the circuit e is open and the vise jaws 112 are not actuated. The motor 89 revolves the head 80 and, when the workpiece W loaded reaches center drilling stations 21, the switch 117 is again actuated and, with button 113 now released to return to "up" position so that line d is closed and relay R closes contacts $R_1$, the vise jaws 112 are advanced by the solenoid 118 in each cylinder 110a to grip the workpieces W at stations 21 and 22. When the vise jaws 112 close, limit switch 121 (FIGURE 1) is actuated to close the contacts 121a and 121b simultaneously. When the contacts 121a are closed, the advance solenoid 22 of each cylinder 62 is energized and the rotating spindles 51 which are mounted on the slide housing portions 50a are advanced towards both ends of the workpiece W at the plunge milling stations 22. When the contacts 121b are closed, the advance solenoid 128 of each valve 37a is energized and the rotating spindles 27 are advanced toward both ends of the workpiece W at the center drilling stations 21.

The spindles 51 are first rapid traversed and then are slowed to the desired feed rate in the conventional manner by a limit switch after a predetermined advance of the spindle 51. In terms of time, the rapid advancing of the workpiece may consume one second and the actual plunge milling machining time six seconds, the spindles 51 moving through the approximately ¼ inch of axial machining travel at a feed rate of about .005 inch per revolution when the speed of rotation of the spindles 51 is about 500 r.p.m. The hydraulic mechanism for rapid advancing the cylinder pistons 66 and thence moving them at the desired feed rate is well known in the art and forms no part of the present invention. The center drilling spindles 27, which revolve at approximately 550 r.p.m., are also rapidly traversed for about a second and thence slowed to a feed rate of approximately .015 inch per revolution to proceed through the approximately one inch axial feed stroke of the center drills 47. Similar conventional mechanism is employed including the usual limit switch connected to the hydraulic system to terminate the forwarding and return rapid traverse of the center drilling spindles and cause the tools on spindles 27 to engage the workpiece at the desired feed rate. Valve 37a is responsible for transmitting fluid under pressure to the cylinder 37 in each instance. When the center drilling spindle 27 in each instance has traveled forwardly far enough to operate limit switch 42, the limit switch contacts 42a close and the retract solenoid 125 of each cylinder 62 is energized to transmit fluid under pressure to the right end of the cylinder 37 in each instance and retract spindle 27. The spindles 51 are similarly retracted when the actuators 74 operate limit switches 72 and make contacts 72a to energize the retract solenoids 126 which operate valves 37a to cause pressure fluid to be transmitted to the right end of each cylinder 62 and retract each spindle 51. When limit switches 72 are actuated, contacts 72b are also closed and operate the retract solenoids 119 of cylinders 110a to open the vise jaws 112 so that the cycle can commence once again.

Because of the very short feed stroke required in the plunge milling operation, the milling operation can be performed at about the same rate of speed as the center drilling operation. In accomplishing the plunge milling operation, the center drilled opening x has, of course, already been provided and it is necessary only to mill the remaining end surfaces of the workpiece. Except for this, it would not be possible to mill the end faces of the workpieces in this manner and achieve the desired cycle time, because tools 61, if extended all the way to the axis of the tool shanks 60, would have a zero cutting speed at the axis. Thus, it is necessary to the operation which is being performed that the center drilling be performed on a given workpiece prior to plunge milling and that the center drilling and plunge milling be performed on different workpieces at the same time. It is in this manner that the cycle time of ten seconds per piece can be obtained on the machine.

It is to be understood that the drawings and descriptive matter are in all cases to be interpreted as merely illustrative of the principles of the invention rather than as limiting the same in any way, since it is contemplated that various changes may be made in the various elements to

We claim:

1. A method of machining shafts comprising: simultaneously advancing center drilling tools into the end faces of a first shaft at opposed center drilling stations, and with a predetermined first axial feed rate; moving said first shaft to opposed plunge milling stations while simultaneously moving a second shaft to said center drilling stations to replace said first shaft; and advancing plunge milling tools into both center drilled end faces of said first shaft at a second axial rate slower than said first axial feed rate while simultaneously center drilling both end faces of said second shaft at said first axial feed rate.

2. The combination defined in claim 1 in which a third shaft is loaded to an indexing work carrying member while said first and second shafts are respectively being plunge milled and center drilled.

3. The combination defined in claim 1 in which said work carrying member is indexed sequentially to said center drilling and plunge milling stations, and to a shaft discharge station.

4. In a machine tool for machining shafts: frame means; opposite center drilling stations mounted thereon; opposite plunge milling stations also on said frame means; a plurality of work holding and carrying means movable to said center drilling stations and plunge milling stations in sequence; axially movable center drills for said center drilling stations; means for advancing said center drills axially into the ends of a shaft between said center drilling stations; means for rotating said drills and shaft relatively; plunge milling tools for said plunge milling stations; each of said plunge milling tools including a shank with a generally radially extending cutter member on the end face thereof; means for simultaneously advancing said plunge milling tools into the ends of a second shaft at said plunge milling stations while said center drills are being advanced axially; means for rotating said plunge milling tools and shaft relatively; and means for moving said work holding and carrying means from between said center drilling stations to a position between said plunge milling stations.

5. In a machine tool for machining shafts: frame means; opposite center drilling stations mounted thereon; opposite plunge milling stations also on said frame means; a plurality of work holding and carrying means movable to said center drilling stations and plunge milling stations in sequence; axially movable center drills for said center drilling stations; means for advancing said center drills axially into the ends of a shaft between said center drilling stations; means for rotating said drills and shaft relatively; plunge milling tools for said plunge milling stations; means for simultaneously advancing said plunge milling tools into the ends of a second shaft at said plunge milling stations while said center drills are being advanced axially; means for rotating said plunge milling tools and shaft relatively; means for moving said work holding and carrying means between said center drilling stations to a position between said plunge milling stations; axially reciprocable spindles mounting said plunge milling tools; outboard slide bearings for said plunge milling tools being provided near the cutting ends thereof; and roller bearing means supporting said slide bearings in axially fixed positions.

6. In a machine tool for machining shafts; frame means; opposite center drilling stations mounted thereon; opposite plunge milling stations also on said frame means; a plurality of work holding and carrying means movable to said center drilling stations and plunge milling stations in sequence; axially movable center drills for said center drilling stations; means for advancing said center drills axially into the ends of a shaft between said center drilling stations; means for rotating said drills and shaft relatively; plunge milling tools for said plunge milling stations; means for simultaneously advancing said plunge milling tools into the ends of a second shaft at said plunge milling stations while said center drills are being advanced axially; means for rotating said plunge milling tools and shaft relatively; means for moving said work holding and carrying means from between said center drilling stations to a position between said plunge milling stations; work holding and carrying means comprising a plurality of indexing, quick release chuck means mounted for rotation about a common axis and movable from a load station sequentially to positions between said center drilling stations and said plunge milling stations, and thence movable to a discharge station.

7. The combination defined in claim 6 in which said chuck means comprises spring returned jaw means movable to receive and discharge a shaft.

8. In a machine tool for machining shafts; frame means; opposite center drilling stations mounted thereon; opposite plunge milling stations also on said frame means; a plurality of work holding and carrying means movable to said center drilling stations and plunge milling stations in sequence; axially movable center drills for said center drilling stations; means for advancing said center drills axially into the ends of a shaft between said center drilling stations with a predetermined first axial feedrate; means for rotating said drills and shaft relatively; plunge milling tools for said plunge milling stations; means for simultaneously advancing said plunge milling tools into the ends of a second shaft at said plunge milling stations at a second axial feedrate slower than said first axial feedrate while said center drills are being advanced axially; means for rotating said plunge milling tools and shaft relatively; and means for moving said work holding and carrying means from between said center drilling stations to a position between said plunge milling stations.

9. A machine tool as set forth in claim 8 wherein said work holding and carrying means comprises a plurality of indexing, quick release jaw means movable to open and closed positions to receive and discharge a shaft; said jaw means normally being spring biased to the closed position; and clamping means to grip the workpieces at the drilling and reaming stations.

10. A machine tool as set forth in claim 8 in which said work holding and carrying means comprises a plurality of indexing, quick release jaw means movable to open and closed positions to receive and discharge a shaft, and jaw means normally spring biased to the closed position; and stripper bar means for automatically stripping said shafts from said jaw means when said shafts pass said stripper bar means.

11. In a machine tool for machining shafts; frame means; a center drilling station mounted thereon; a plunge milling station also on said frame means; a plurality of work holding and carrying means movable to said center drilling station and plunge milling station in sequence; an axially movable center drill for said center drilling station; means for advancing said center drill axially into the end of a shaft with a predetermined first axial feedrate; means for rotating said drill and shaft relatively; a plunge milling tool for said plunge milling station; means for simultaneously advancing said plunge milling tool into the end of a second shaft at said plunge milling station at a second axial feedrate slower than said first axial feedrate while said center drill is being advanced axially; means for rotating said plunge milling tool and shaft relatively; and means for moving said work holding and carrying means from said center drilling station to a position adjacent said plunge milling station.

12. A method of machining shafts comprising: simultaneously advancing center drilling tools into the end faces of a first shaft at opposed center drilling stations, and with a predetermined first axial feedrate; moving said first shaft to opposed plunge milling stations while simultaneously moving a second shaft to said center drilling stations to replace said first shaft; clamping said first and second shafts at said plunge milling and drilling stations respectively; and advancing plunge milling tools into both center drilled end faces of said first shaft at a second axial feed rate while simultaneously center drilling both end faces of said second shaft at said first axial feed rate.

References Cited
UNITED STATES PATENTS

| | | | |
|---|---|---|---|
| 1,720,784 | 7/1929 | Eden | 29—27 |
| 1,797,729 | 3/1931 | Orbez | 29—27 |
| 2,088,119 | 7/1937 | Schlitz | 29—558 |
| 2,646,723 | 7/1953 | Donohoe | 29—558 X |
| 2,747,271 | 5/1956 | Raehrs et al. | 29—558 |
| 2,775,026 | 12/1956 | Schrader | 29—558 X |
| 2,807,001 | 9/1957 | Demarkles et al. | 29—558 |
| 2,850,789 | 9/1958 | Hallenbeck et al. | 29—38.2 |
| 3,208,127 | 9/1965 | Witzig et al. | 29—38.2 |
| 3,267,550 | 8/1966 | Whittom et al. | 29—27 |

PAUL M. COHEN, Primary Examiner

U.S. Cl. X.R.

29—27, 38.2, 156.5, 559, 563, 564